(12) United States Patent
Okada et al.

(10) Patent No.: US 7,681,705 B2
(45) Date of Patent: Mar. 23, 2010

(54) MULTI DISC FRICTION CLUTCH AND MOTORCYCLE THEREWITH

(75) Inventors: Yoshio Okada, Kakogawa (JP); Hiroyuki Kikuchi, Kobe (JP); Hiroyuki Watanabe, Kobe (JP); Waka Izumi, Kobe (JP); Takahiro Jozaki, Akashi (JP)

(73) Assignee: Kawasaki Jukogyo Kabushiki Kaisha, Kobe-shi, Hyogo (JP)

( * ) Notice: Subject to any disclaimer, the term of this patent is extended or adjusted under 35 U.S.C. 154(b) by 406 days.

(21) Appl. No.: 11/717,202

(22) Filed: Mar. 13, 2007

(65) Prior Publication Data

US 2007/0221465 A1 Sep. 27, 2007

(30) Foreign Application Priority Data

Mar. 14, 2006 (JP) .............................. 2006-069528
Mar. 2, 2007 (JP) .............................. 2007-052590

(51) Int. Cl.
*F16D 13/54* (2006.01)
*F16D 43/20* (2006.01)

(52) U.S. Cl. ................ 192/54.5; 192/55.1; 192/70.23; 192/89.26

(58) Field of Classification Search ................ 192/56.6, 192/55.1, 70.23, 54.1, 54.51
See application file for complete search history.

(56) References Cited

U.S. PATENT DOCUMENTS

| 4,883,152 A | * | 11/1989 | Froment ...................... 192/42 |
| 6,533,056 B1 | * | 3/2003 | Maimone ................... 180/230 |
| 2002/0144876 A1 | * | 10/2002 | Harvey .................... 192/223.3 |

FOREIGN PATENT DOCUMENTS

| JP | 61-96222 | | 5/1986 |
| JP | 2005308092 A | * | 11/2005 |

* cited by examiner

*Primary Examiner*—Rodney H Bonck
(74) *Attorney, Agent, or Firm*—Wenderoth, Lind & Ponack, L.L.P.

(57) ABSTRACT

A multiple disc friction clutch comprises a clutch outer for take in power, a clutch hub for take out power, friction plates, a clutch spring pressing a pressing member to the friction plates for connecting the clutch, a spring receiving member supporting the clutch spring, and a coupling hub coupled to the spring receiving member as to be integrally movable. A spline inclined against an output axis is formed in a fitting portion between the coupling hub and a tube shaft, and moves the clutch spring in an axial direction of the tube shaft to a compressing side while relatively rotating the coupling hub against the tube shaft, in the case that an engine drive torque is equal to or more than a predetermined value, thereby increasing a pressing load.

11 Claims, 15 Drawing Sheets

MULTI DISC FRICTION CLUTCH AND MOTORCYCLE THEREWITH

BACKGROUND OF THE INVENTION

1. Technical Field of the Invention

The present invention relates to a multiple disc friction clutch and a motor cycle therewith.

2. Description of Related Prior Art

Generally, a multiple disc friction clutch is provided with a clutch outer member for taking in or inputting a power from an engine side, and a clutch hub for taking out or outputting the power from the clutch to a rotating member, and is structured such that a plurality of input friction plates and output friction plates are arranged between the clutch outer member and the clutch hub, and the clutch is connected by pressing a pressing member onto the friction plates in an axial direction of the rotating member by means of a clutch spring. Further, the clutch is disconnected by moving the pressing member in the axial direction of the rotating member against the clutch spring by means of a release mechanism.

A pressing load of the pressing member against the friction plates is set by the clutch spring, however, is generally fixed to a constant value regardless of a change of an engine drive torque. Accordingly, in a small-sized clutch, a value of the pressing load is small and a clutch operating load on releasing becomes small in correspondence thereto, and in a large-sized clutch, the value of the pressing load is large and the clutch operating load on releasing becomes large in correspondence thereto (Japanese Unexamined Patent Publication No. 61-96222).

If the clutch operating load on releasing is increased as mentioned above in accordance with the enlargement in size of the clutch, a comfortableness of the clutch operation is lowered. Particularly, for a person who has less physical strength such as a woman, an elderly person, or the like, if the clutch operating load is large, a load applied to a wrist or a finger becomes large, and it is impossible to comfortably execute the clutch operation.

With respect to the multiple disc friction clutch in which the pressing load is fixed to the constant value, in order to reduce the clutch operating load, there has been developed a multiple disc friction clutch which can assist (increase) a clutch operating force by a hydraulic mechanism and can increase the pressing load. However, since it is necessary that the hydraulic mechanism is provided, a cost becomes higher as well as a parts number is increased.

An object of the present invention is to provide a multiple disc friction clutch mounted to a vehicle, such as a motor cycle or the like, in which it is possible to reduce a clutch operating load on releasing on the basis of a simple structure by utilizing an engine drive torque without requiring an expensive and complicated part such as the hydraulic mechanism or the like.

Another object of the present invention is to achieve a structure which can reduce a number of friction plates or downsize a diameter of the friction plate while maintaining a torque transmission capacity of the clutch, in a motor cycle or the like in which it is not necessary to reduce the clutch operating load.

SUMMARY OF THE INVENTION

In order to solve the above problems, the present invention provides a multiple disc friction clutch comprising: a clutch outer member for taking in a power from an engine; a clutch hub for taking out the power from the clutch to a rotating member; a plurality of input friction plates and output friction plates arranged between the clutch outer member and the clutch hub; a clutch spring pressing a pressing member onto the friction plates in an axial direction of the rotating member for connecting the clutch; a spring receiving member for supporting the clutch spring; and a coupling hub arranged in an outer periphery of the rotating member and coupled to the spring receiving member in such a manner as to be integrally movable in the axial direction of the rotating member, wherein a guide groove or a guide projection inclined with respect to an axis of the rotating member is formed in one of an inner peripheral surface of the coupling hub and an outer peripheral surface of the rotating member, and an engagement portion engaging with the guide groove or the guide projection is formed in the other, and the coupling hub is moved so as to compress the clutch spring in the axial direction of the rotating member and relatively rotate with respect to the rotating member when an engine drive torque is increased to a predetermined value or more.

In accordance with this structure, since the pressing load generated by the clutch spring is automatically increased from an initial set load by utilizing the engine drive torque during the engine operation, it is possible to disconnect the clutch by the same level of clutch operation load as the case of the small-sized clutch even in the case that the clutch is enlarged in size, whereby it is possible to comfortably operate the clutch. Further, in accordance with the other utilization aspect, in the case that it is not necessary to reduce the clutch operating load, it is possible to reduce the number of the friction plates, or it is possible to downsize the diameter of the friction plate without making the torque transmission capacity of the clutch small, by utilizing the fact that the pressing load generated by the clutch spring is automatically increased. In other words, it is possible to downsize the clutch, or reduce the parts number of the clutch. Further, in any utilization aspect, since it is not necessary to be provided with any special hydraulic mechanism or the like, not only the parts number is not increased, but also the structure is not complicated.

Further, it is possible to adjust a pressing load increase start time, or a change characteristic such as a pressing load increase speed (increase rate) or the like in correspondence to various clutches, by changing an angle of incline of the guide groove or the guide projection.

Preferably, an inclined spline portion is formed as the guide groove or the guide projection, and the engagement portion.

In accordance with this structure, since the structure is made such as to move the coupling hub in the axial direction of the rotating member and relatively rotate with respect to the rotating member, by utilizing the inclined spline portion, it is possible to smoothly convert a part of the engine drive torque to the thrust force in the axial direction of the rotating member, in comparison with the structure in which the coupling hub is moved in the axial direction of the rotating member such as the clutch output shaft or the like by utilizing the cam or the like, and it is possible to slowly increase the pressing load, whereby it is possible to smoothly execute the pressing load increasing effect.

Preferably, the multiple disc friction clutch is provided with a return spring urging or energizing the coupling hub so as to cancel the compression of the clutch spring.

As mentioned above, it is possible to adjust (set) the change characteristic of the pressing load by changing the angle of incline of the guide groove or the guide projection, additionally, it is possible to freely adjust (set) the change characteristic of the pressing load in a wider range, by being provided with the return spring and combining the adjustment of the return spring and the adjustment of the angle of incline of the guide groove or the like.

Preferably, a lifter member movable in the axial direction of the rotating member is arranged as a back torque limiter mechanism in such a manner as to face to the pressing member from the axial direction of the rotating member, and when a back torque from the rotating member becomes equal to or more than a predetermined value, the coupling hub is relatively rotated in a rotating direction with respect to the clutch hub, the lifter member is moved in the axial direction of the rotating member by a cam mechanism formed on the coupling hub, and the pressing member is pushed and moved in a clutch off direction.

In accordance with this structure, since the coupling hub is utilized for both of the back torque limiter and the increase of the pressing load, it is possible to achieve a reduction of the parts number and a reduction of the cost as a whole of the clutch, in the clutch provided with the back torque limiter.

Preferably, a back torque limiter mechanism is structured such that the coupling hub moves the spring receiving member so as to reduce a pressing load generated by the clutch spring when a back torque becomes equal to or more than a predetermined value, and is provided with a back torque spring which is compressed on the basis of a movement of the coupling hub on the back torque. The predetermined value of course includes "0".

In accordance with this structure, since it is possible to set the clutch in a half clutch state or it is possible to disconnect the clutch without pressing the pressing member when the back torque is applied on engine brake state or the like, there is not generated a pulse phenomenon of the clutch lever caused by the transmission of the motion of the pressing member to the clutch lever on the engine brake state or the like, and a rider can maintain a comfortable drive without feeling any uncomfortable feeling.

Preferably, the back torque spring is constituted by one or a plurality of disc springs.

As mentioned above, in the case that the disc spring for the back torque is provided, it is possible to easily arrange the disc spring for the back torque even in a small space, particularly, a narrow space in the axial direction of the rotating member, so that it is possible to maintain the clutch compact, and it is possible to achieve the reduction of the cost.

Preferably, the back torque spring is constituted by one or a plurality of coil springs.

As mentioned above, if the coil spring for the back torque is provided, it is possible to precisely set a back torque limit value or the like in which the clutch comes to the half clutch state to a desired value, in the case that the back torque is applied such as the engine braking time or the like.

Preferably, the back torque spring is provided so as to be compressed at a predetermined set load by a locking means constituted by an independent member from the coupling hub.

As the locking means, for example, there is included a shoulder formed in an outer periphery of the rotating member, a lock ring or the like. It is possible to set such that the spring for the back torque is not applied to the coupling hub on engine drive, by means of the locking means, and it is possible to simply and precisely set an amount of increase of the pressing load on engine drive to a desired value.

Further, the present invention provides a motor cycle provided with the multiple disc friction clutch.

In accordance with this structure, even in the case that the clutch is enlarged in size, the clutch operating load can be suppressed, for example, to a level of the small-sized motor cycle, and it is possible to maintain a comfortableness of the clutch operation of the large-sized motor cycle.

DETAILED DESCRIPTION OF THE INVENTION

Detailed Description of the Preferred Embodiments

First Embodiment

FIGS. 1 to 14 show an embodiment of a multiple disc friction clutch for a motor cycle in accordance with the present invention, and a description will be given on the basis of these drawings.

[Basic Structure of Multiple Disc Friction Clutch]

Figure 1:
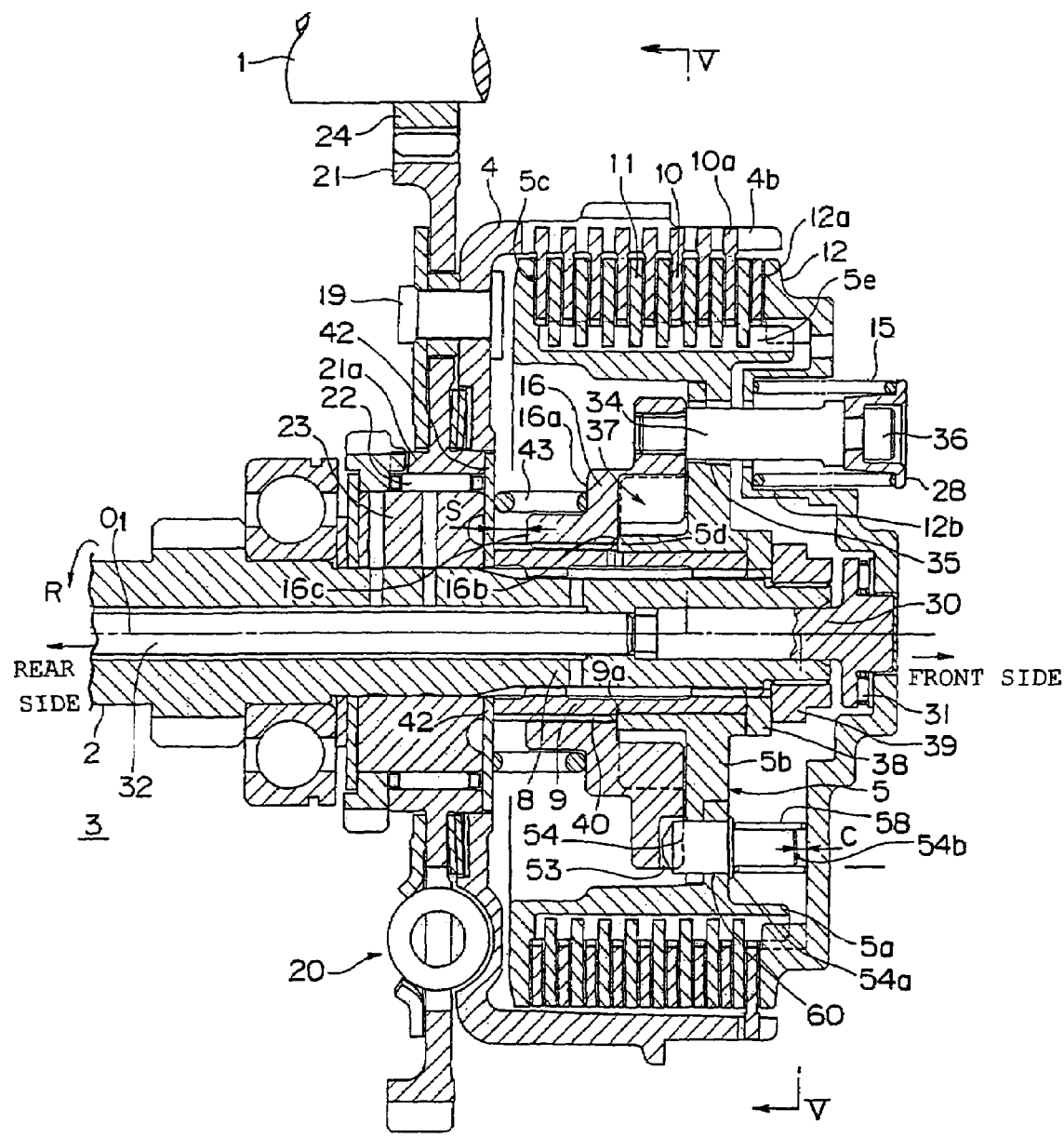
FIG. 1 is a vertical cross sectional view showing a first embodiment of a multiple disc friction clutch in accordance with the present invention.

FIG. 1 is a vertical cross sectional view of a whole of a multiple disc friction clutch. In FIG. 1, the multiple disc friction clutch is arranged between a crank shaft 1 and an input shaft 2 of a gear transmission 3 in a power transmission path from an engine (not shown) of a motor cycle to a rear wheel (not shown), and is provided with a clutch outer member 4 for take in power into the clutch, a clutch hub 5 for take out power from the clutch, a clutch output shaft 8 integrally formed with the input shaft 2, a clutch output tube shaft (rotating member) 9 spline fitted to an outer peripheral surface of the clutch output shaft 8 in such a manner as to be immovable in an axial direction of the clutch output shaft 8, a plurality of input friction plates 10 and output friction plates 11 arranged between the clutch outer member 4 and the clutch hub 5, a pressing member (a pressure plate or a pusher plate) 12 pressing both the friction plates 10 and 11 in an axial direction of the clutch output shaft 8 (in other words, an axial direction of the tube shaft 9), and a coil-shaped clutch spring 15 applying a pressing load to the pressing member 12. Further, in addition to each of the members for pressing or the like, there is provided a movable coupling hub 16 which is utilized for both of a pressing load increasing mechanism and a back torque limiter mechanism mentioned below, as well as transmitting a torque between the clutch hub 5 and the tube shaft 9. A shift output shaft (not shown) of the gear transmission 3 is coupled to the rear wheel in an interlocking manner, for example, via a chain transmission mechanism.

For convenience of explanation, a description will be given below by simply calling the axial direction of the clutch output shaft 8 and the tube shaft 9 as "axial direction", and referring the pressing member 12 side as "front side in axial direction" and the gear transmission 3 side as "rear side in axial direction", as shown by an arrow in FIG. 1. Of course, the front and rear directions defined here have no relation to a front side and a rear side of the motor cycle in which the clutch is mounted, and the scope of the present invention is not limited to the defined front and rear directions.

The clutch outer 4 is formed in a closed-end cylindrical shape, and is connected to a clutch input gear 21 via a rivet 19 and a torsion spring 20 in such a manner as to be freely twisted in a circumferential direction thereof. The clutch input gear 21 is engaged with a crank gear 24 fixed to or integrally formed with the crank shaft 1 of the engine, and an inner peripheral boss portion 21a of the clutch input gear 21 is rotatably fitted to an inner race member 23 fixed to an outer peripheral surface of the clutch output shaft 8 via a needle bearing 22. A plurality of axial grooves 4b extending in an axial direction are formed in a cylinder portion of the clutch outer 4 in such a manner as to be spaced at an approximately equal interval in a circumferential direction, and an outward projection portion 10a of the input friction plate 10 is engaged with the axial groove 4b in such a manner as to be integrally rotatable with the clutch outer 4.

Figure 5:
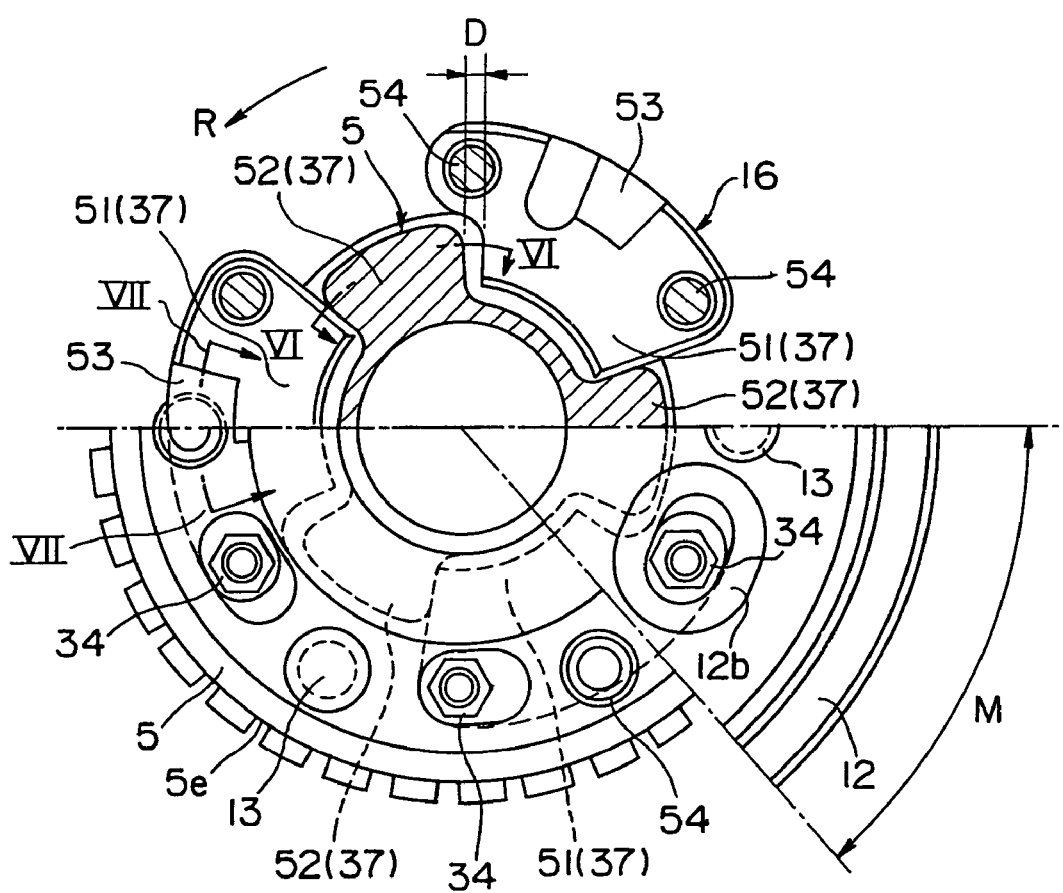
FIG. 5 is a cross sectional view along a line V-V in FIG. 1 on an engine drive, in which a range M shows a state as seen from a forward side of the pressing member.
Figure 10:
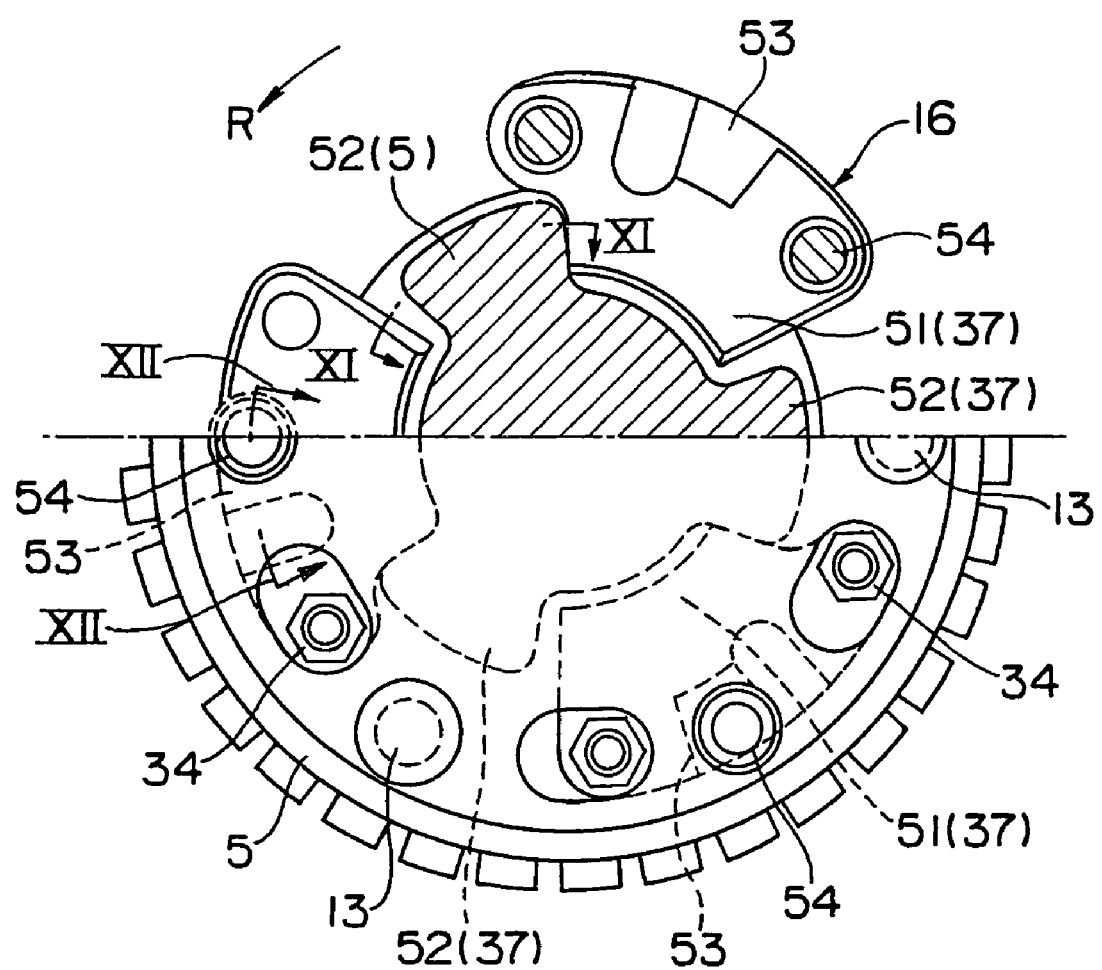
FIG. 10 is a cross sectional view along a line V-V in FIG. 1 on a strong engine brake.

The clutch hub 5 is constituted by an outer member 5a supporting the output friction plates 11, and an inner member 5b integrally connected to the outer member 5a by a rivet 13 (refer to FIGS. 5 and 10). The inner member 5b is rotatably fitted to an outer peripheral surface of the tube shaft 9, and an inner peripheral boss portion of the inner peripheral side member 5b is locked by a front side come-off prevention ring 38 and a shoulder surface 9a of the tube shaft 9 in such a manner as to be immovable in the axial direction. The come-off prevention ring 38 is locked in the axial direction from the front side by a nut 39 screwed to a front end portion of the clutch output shaft 8.

A plurality of axial grooves 5e are formed in a tubular outer peripheral portion of the clutch hub 5, and an inner peripheral projection portion of the output friction plate 11 is engaged with the groove 5e in such a manner as to be integrally rotatable with the clutch hub 5. The input friction plates 10 and the output friction plates 11 are alternately arranged in the axial direction, a pressing surface 5c of the clutch hub 5 faces to a rear end surface of a friction plate group constituted by both the friction plates 10 and 11, and a pressing surface 12a of the pressing member 12 faces to a front end surface of the fiction plate group.

The pressing member 12 is formed in a disc shape, a spring storing concave portion 12b is formed at a plurality of positions (for example, six positions) so as to be spaced at an approximately equal interval in a circumferential direction thereof, and a clutch spring 15 is inserted to each of the spring storing concave portions 12b. Each of the clutch springs 15 is provided so as to be compressed in an axial direction between a bottom surface of the spring storing concave portion 12b and a spring receiving member 28, urges or energizes the pressing member 12 to a rear side on the basis of an elastic force of the clutch spring 15, pinches both the friction plates 10 and 11 between the pressing surface 12a of the pressing member 12 and the pressing surface 5c of the clutch hub 5, and connects the clutch.

A coupling rod 34 which is approximately in parallel to the clutch output shaft 8 is fixed to the spring receiving member 28 by a fixing bolt 36, the coupling rod 34 extends to a rear side so as to pass through a rod insertion hole 35 of the clutch hub 5, and is screwed to the coupling hub 16. Accordingly, the coupling hub 16 and the sprig receiving member 28 are integrally movable in the axial direction.

The coupling hub 16 is coupled to the clutch hub 5 by a dog type coupling portion 37 in such a manner as to freely transmit torque therebetween, and is coupled to the outer peripheral surface of the tube shaft 9 by a inclined spline coupling portion 40 for the pressing load increasing mechanism in such a manner as to freely transmit the torque and be movable in the axial direction. A coil-shaped return spring 43 is provided in a compressed manner between a rearward annular shoulder surface 16a of the coupling hub 16 and a locking plate 42 arranged in a front side of the inner race member 23, and the coupling hub 16 is urged or energized to the front side on the basis of an elastic force of the return spring 43, and a front end surface 16b of an inner peripheral boss portion of the coupling hub 16 is brought into contact with a rear end surface 5d of the inner peripheral boss portion of the clutch hub 5.

A thrust bearing (a release bearing) 31 provided in a front end portion of a release rod 30 is brought into contact with a rear surface of an inner peripheral end portion of the pressing member 12 from a rear side, and the release rod 30 is fitted into the clutch output shaft 8 so as to be movable in the axial direction and is brought into contact with an intermediate transmission rod 32 in a rear end surface. The intermediate transmission rod 32 extends to a rear side within the clutch output shaft 8 and within the input shaft 2, reaches a rear end of the input shaft 2, and is coupled to a clutch lever (not shown) of the motorcycle via an appropriate clutch operating force transmission mechanism such as a wire mechanism or the like in an interlocking manner. In other words, the structure is made such so as to press and move the release rod 30 and the thrust bearing 31 to the front side via the clutch operating force transmission mechanism and the intermediate transmission rod 32 by gripping the clutch lever, thereby moving the pressing member 12 to the front side against the clutch spring 15 so as to disconnect or reduce the torque transmission between the clutch outer member 4 and the clutch hub 5.

[Pressing Load Increasing Mechanism]

Figure 3:
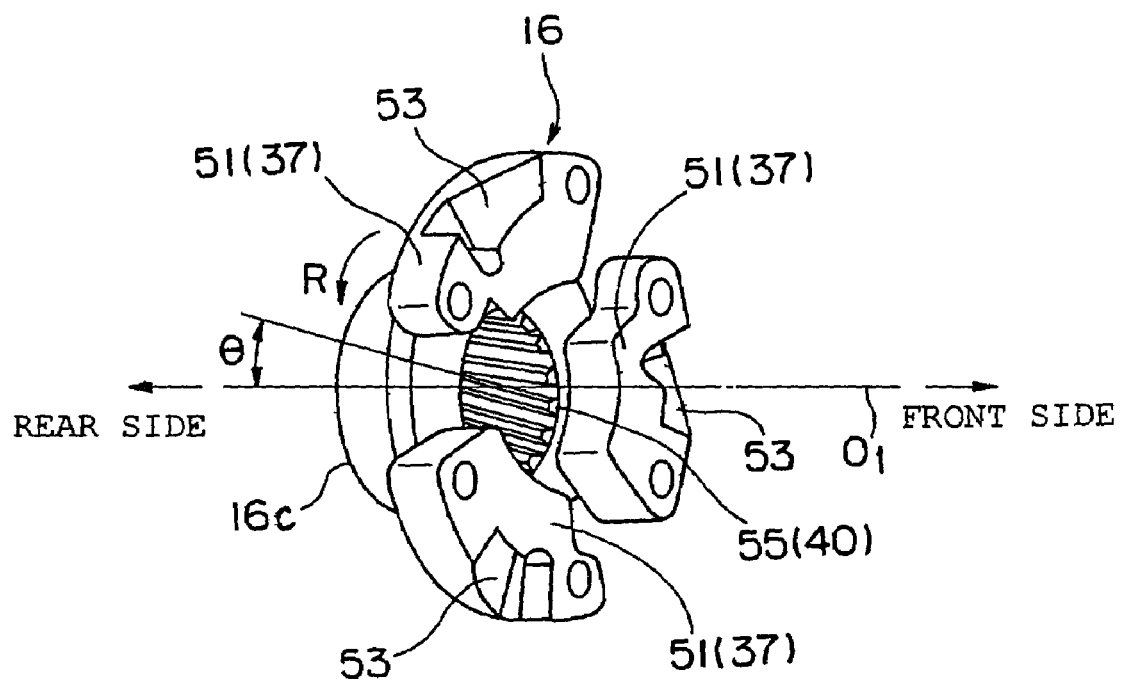
FIG. 3 is a perspective view of a coupling hub in FIG. 1.

The pressing load increasing mechanism is structured as follows by utilizing the movable coupling hub 16. FIG. 3 is a perspective view of the coupling hub 16. For example, three projection portions 51 for the dog type coupling portion 37 are formed in a front portion of the coupling hub 16 so as to be spaced at an approximately equal interval in a circumferential direction, and three cam slant surfaces 53 for the back torque limiter are formed on an outer peripheral surface of the front portion of the coupling hub 16 so as to be spaced at an approximately equal interval in the circumferential direction. Further, in order to construct the inclined spline coupling portion 40 on an inner peripheral surface of the coupling hub 16, a inclined spline 55 inclined at a predetermined angle θ with respect to an output shaft core O1 is formed. In the embodiment, the inclined spline 55 has an involute tooth surface, and the angle θ of incline is set, for example, to 10 degree. The cam slat surface 53 is formed in such a manner that a depth in the front and rear direction is deeper toward a rotating direction R side.

Figure 2:
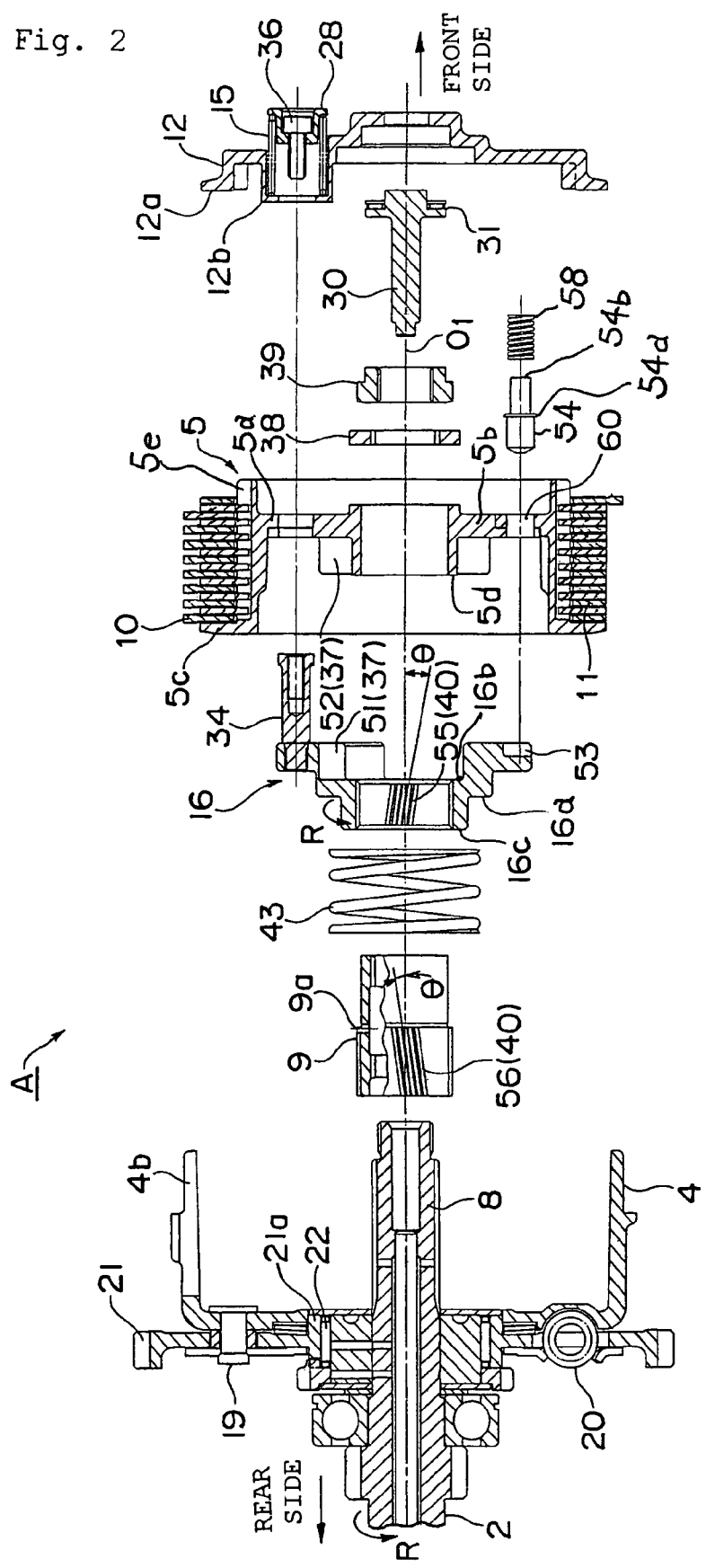
FIG. 2 is an exploded vertical cross sectional view of the multiple disc friction clutch in FIG. 1.

FIG. 2 is an exploded vertical cross sectional view of the multiple disc friction clutch in FIG. 1. In this FIG. 2, the inclined spline coupling portion 40 is constituted by the inclined spline 55 formed on the inner peripheral surface of the coupling rib 16, and an inclined spline 56 formed on the outer peripheral surface of the tube shaft 9 in such a manner as to be engaged with the inclined spline 55. The inclined spline portion 56 of the tube shaft 9 is inclined at the same angle θ of incline as that of the inclined spline 55 of the coupling hub 16. A direction of incline of the inclined splines 55 and 56 is set in such a manner that rear end portions of the inclined splines 55 and 56 come to the rotating direction R side than the front end portions, whereby the structure is made such that the coupling hub 16 is moved relatively to a rear side with respect to the tube shaft 9 on the basis of a guide effect of both the inclined splines 55 and 56, when the coupling hub 16 is relatively rotated in the clutch rotating direction R side with respect to the tube shaft 9, and the coupling hub 16 is returned relatively to the front side with respect to the tube shaft 9 when the tube shaft 9 is relatively rotated to the clutch rotating direction R side with respect to the coupling hub 16.

A moving range of the coupling hub 16 on the tube shaft 9 in the axial direction corresponds to a stroke S from an initial position at which the front end surface 16b of the inner peripheral boss portion of the coupling hub 16 is brought into contact with the rear end surface 5d of the inner peripheral boss portion of the clutch hub 5, to a maximum moving position at which the rear end surface 16c of the inner peripheral boss portion of the coupling hub 16 is brought into contact with the locking plate 42 in a rear side, as shown in FIG. 1.

A time when the coupling hub 16 starts moving from the initial position to the rear side and a moving amount of the coupling hub 16 to the rear side with respect to an increasing amount of the engine drive torque are determined, on the engine drive state, by adjusting a set load of the return spring 43 and a magnitude of the angle θ of incline of the inclined splines 55 and 56. In other words, it is possible to determine a predetermined value of the engine drive torque and an increasing rate of the pressing load at a time when the pressing load starts being increased.

FIG. 5 is a cross sectional view along a line V-V in FIG. 1, and a portion indicated by a range M of a lower portion of FIG. 5 shows a state in which the pressing member 12 is viewed from a front side. In this FIG. 5, three projection portions 52 freely engaging with the respective projection portions 51 of the coupling hub 16 in the circumferential direction are formed as the dog coupling portion 37 in the clutch hub 5 so as to be spaced at an approximately equal interval in the circumferential direction, and both the projection portions 51 and 52 face to each other at a distance of a play D in the circumferential direction. A magnitude of the play D is set at least to a magnitude allowing a relative rotation on an operation of a back torque limiter mechanism mentioned below.

[Back Torque Limiter Mechanism]

In FIG. 1, the back torque limiter mechanism is constituted by the cam slant surface 53 formed in the coupling hub 16, a lifter pin 54 facing to the cam slant surface 53 so as to be freely brought into contact with the cam slant surface 53 from the front side, and the like.

A pin support hole 60 is formed in the clutch hub 5 portion facing to the cam slant surface 53 from the front side, and the lifter pin 54 having a flange portion 54a is fitted to the pin support hole 60 so as to be movable in the axial direction. The lifter pin 54 is extended to the front side from the flange portion 54a, and a front end surface 54b faces to the rear end surface of the pressing member 12 at a distance, of a predetermined gap C. A weak return spring 58 is provided in a compressed manner between the flange portion 54a and the rear end surface of the pressing member 12, and the lifter pin 54 is maintained at a non-operating position in FIG. 1 by energizing the lifter pin 54 to the rear side by means of the return spring 58, and bringing the flange portion 54a into contact with the front end surface of the clutch hub 5.

Figure 7:
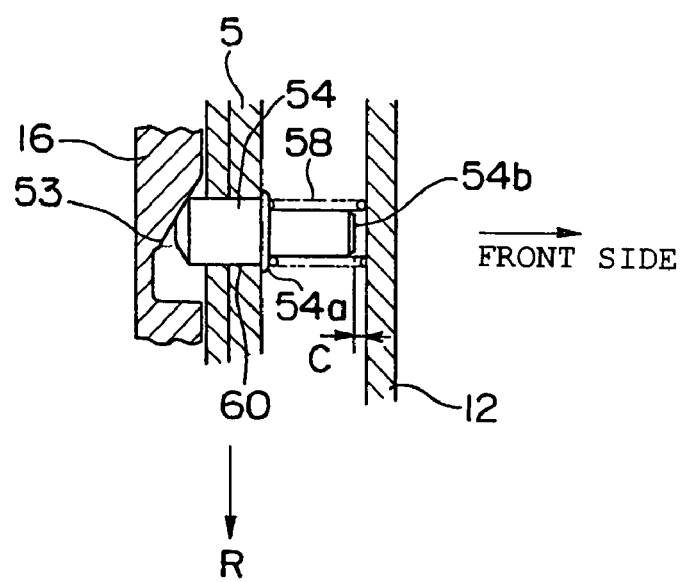
FIG. 7 is a cross sectional view along a line VII-VII in FIG. 5 on the engine drive state at the low torque.
Figure 8:
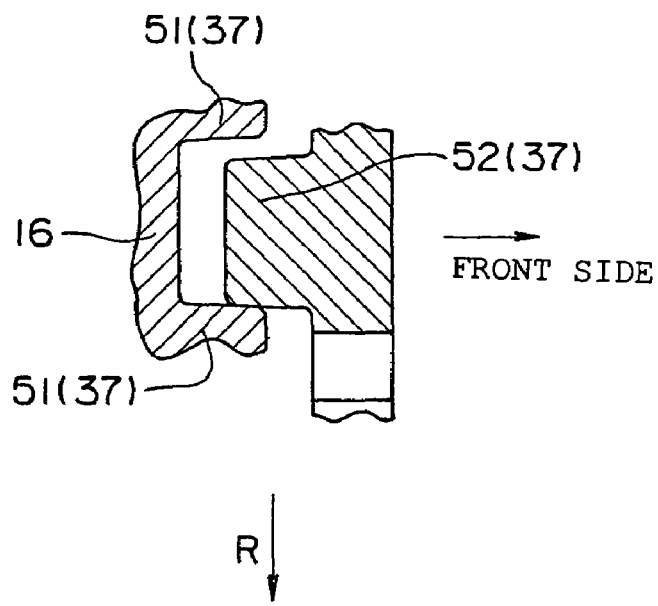
FIG. 8 is a cross sectional view along the line VI-VI in FIG. 5 on the engine drive state at a high torque.
Figure 9:
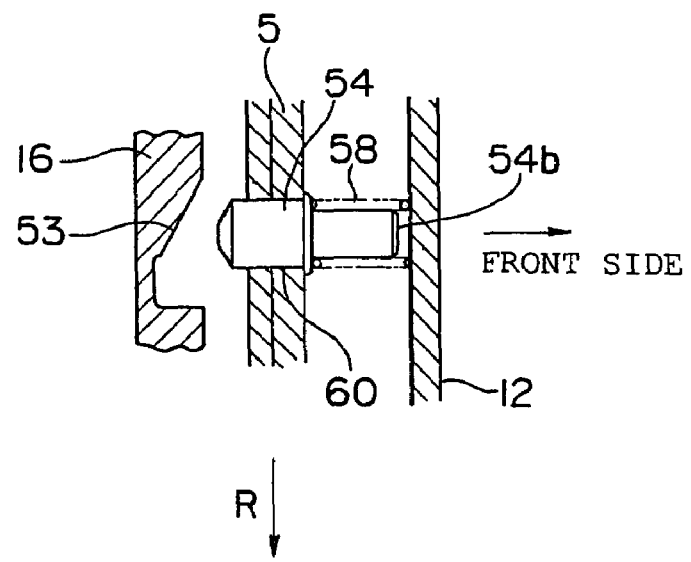
FIG. 9 is a cross sectional view along a line VII-VII in FIG. 5 on the engine drive state at the high torque.
Figure 12:
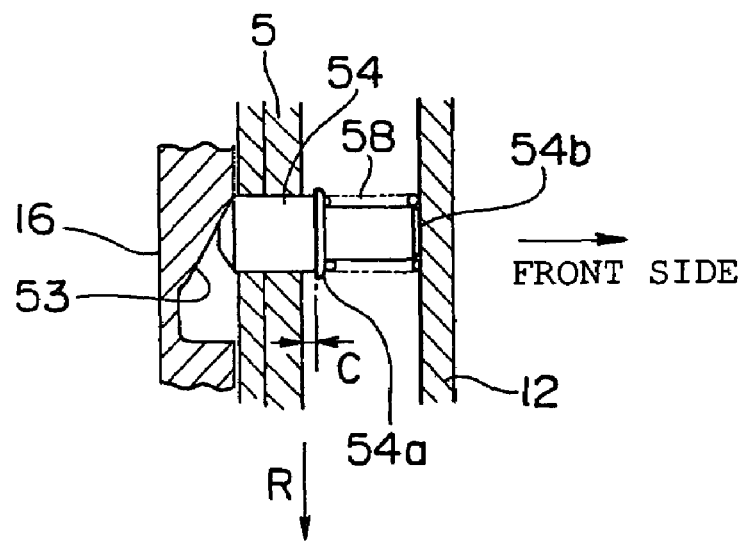
FIG. 12 is a cross sectional view along a line XII-XII in FIG. 10 on the weak engine brake state.
Figure 14:
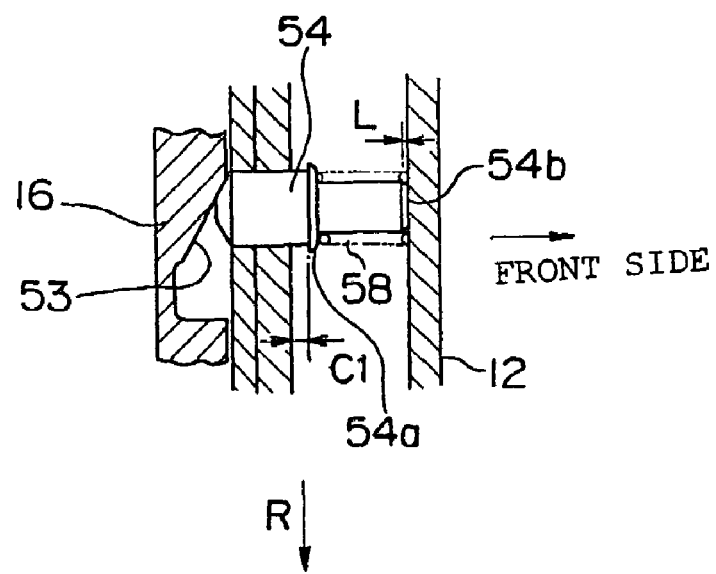
FIG. 14 is a cross sectional view along the line XII-XII in FIG. 10 on the strong engine brake state.

Both of FIGS. 7 and 9 are cross sectional views along a line VII-VII in FIG. 5, in which FIG. 7 shows a state of the lifter pin 54 on the engine drive state at a low torque, and FIG. 9 shows a state of the lifter pin 54 on the engine drive state at a high torque. Both of FIGS. 12 and 14 are cross sectional views along XII-XII in FIG. 10, in which FIG. 12 shows a state of the lifter pin 54 on a weak engine brake state, and FIG. 14 shows a state of the lifter pin 54 on a strong engine brake state. In FIG. 7, the cam slant surface 53 is inclined as mentioned above in such a manner that a depth in the axial direction of the tube shaft 9 becomes deeper toward the rotating direction R side. Accordingly, the structure is made such that in the case that a traveling state is changed from the engine drive state as shown in FIGS. 7 and 9 to the engine brake state as shown in FIGS. 12 and 14, the output side (the wheel side) coupling hub 16 is relatively rotated to the rotating direction R side with respect to the clutch hub 5, and pushes and moves the lifter pin 54 to the front side by the cam slant surface 53.

Until the lifter pin 54 is brought into contact with the rear end surface of the pressing member 12 as shown in FIG. 12 (during the gap C), only the lifter pin 54 is moved to the front side, however, in the case that the back torque is increased to a predetermined value or more, the front end surface 54b of the lifter pin 54 pushes and moves the pressing member 12 to the front side at a predetermined distance L as shown in FIG. 14 so as to set the clutch in a half-clutch state or a disconnection state.

[Setting of Initial Value of Pressing Load and Setting of Load of Return Spring 43]

Figure 15:
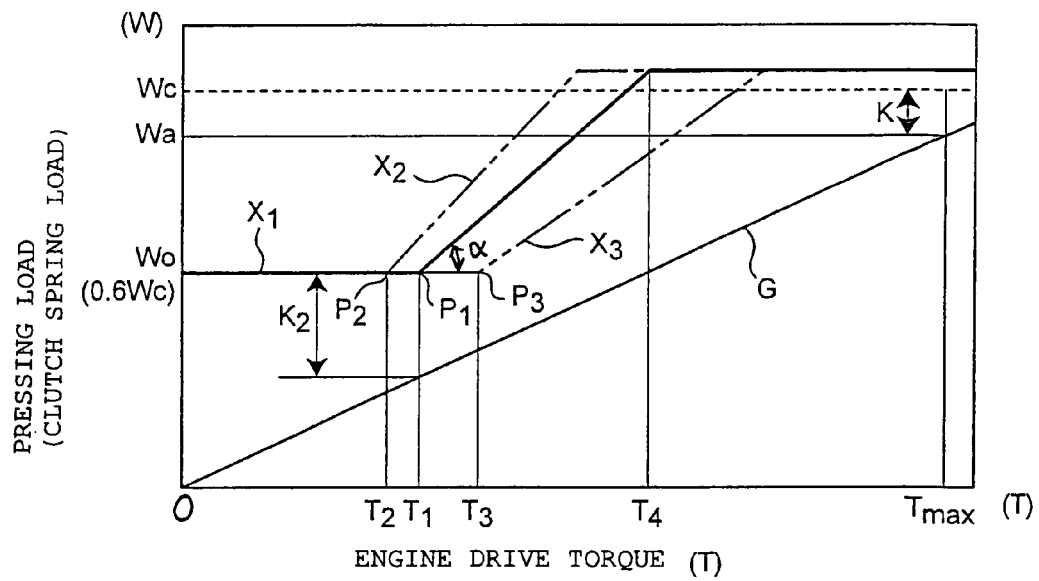
FIG. 15 is a view showing a change characteristic of a pressing load in the embodiment in accordance with the present invention.

In FIG. 15, a horizontal axis is the engine drive torque T, a vertical axis is the pressing load (clutch spring load) W, and a straight line graph G shows a change of the pressing load actually necessary for the clutch. A value of a pressing load Wc corresponds to a value in the case that the pressing load is fixed as conventionally. A value of the pressing load Wc on the vertical axis has a margin K with respect to a pressing load Wa on the graph G on the maximum engine drive torque Tmax. Further, a graph X1 shown by a solid broken line indicates a change characteristic of the pressing load W in the present embodiment. In other words, a maximum pressing load in the graph X1 is set to an approximately equal value to the conventional fixed pressing load Wc, and an initial pressing load W0 in the graph X1 is set to approximately 0.6 times the maximum pressing load (conventional fixed pressing load Wc). Further, the angle θ of incline of the inclined spline portions 55 and 56 in FIG. 2 is set, for example, to 10 degree.

The initial pressing load W0 in FIG. 15 is set by selecting a spring strength of the clutch spring 15 in FIG. 1 and a compression amount on installing, and the maximum pressing load (conventional fixed pressing load Wc) in FIG. 15 is set by mainly setting the stroke S in the axial direction on the tube shaft 9 of the coupling hub 16 in FIG. 1 and the strength of the clutch spring 15.

Further, a rising point P1 of the pressing load of the graph G in FIG. 15 is determined by selecting the set load of the return spring 43 in FIG. 2 and the angle θ of incline of the inclined splines 55 and 56, whereby it is possible to determine a value of the engine drive torque T1 on starting the increase of the pressing load. In the present embodiment, the initial pressing load W0 is set in such a manner as to have a margin K2 than the value of the pressing load on the graph X1 in the engine drive torque T1 at the rising point P1.

[Change and Adjustment of Set Value]

It is possible to freely change the rising point P1 and an inclination α on increasing the pressing load of the change characteristic of the pressing load shown by the graph X1 in FIG. 15, by changing the angle θ of incline of the inclined splines 55 and 56 in FIG. 1.

For example, it is possible to displace the rising point P1 to the engine drive torque large side P3 and to make the inclination α small to make an increasing rate of the pressing load small, as shown by a graph X3 by a phantom line in FIG. 15, by reducing the angle θ of incline of the inclined splines 55 and 56 in FIG. 2 from 10 degree to 8 degree. On the contrary, it is possible to displace the rising point P1 to the engine drive torque small side P2 and to make the inclination α large to make an increasing rate of the pressing load large, as shown by a graph X2 by a phantom line in FIG. 15, by increasing the angle θ of incline of the inclined splines 55 and 56 in FIG. 2 from 10 degree to 12 degree.

Further, as is independent from the change of the angle θ of incline of the inclined splines 55 and 56 in FIG. 2, it is possible to adjust the position of the rising point P1 in FIG. 15 and the inclination α on increasing the pressing load by changing the set load of the return spring 43. For example, if the set load of the return spring 43 in FIG. 2 is set large, it is possible to displace the rising point P1 in FIG. 15 to the engine drive torque large side and to make the inclination α small. On the other hand, if the set load of the return spring 43 in FIG. 2 is made small, it is possible to displace the rising point P1 in FIG. 15 to the engine drive torque small side and to make the inclination α large to enlarge the increasing rate of the pressing load.

In this case, substantially, it is possible to widely select the change characteristic of the pressing load in conformity to a demand of the machine type such as a sport type motor cycle, a motor cycle for carrying load, a general motor cycle and the like, by basically selecting the angle of incline of the inclined splines 55 and 56 on manufacturing the clutch and further adjusting the set load of the return spring 43 on assembling.

[Operation]

(1) Operation on Engine Drive

In FIG. 1, on the engine drive state, when the engine drive torque is transmitted to the wheel side from the engine side, the engine drive torque is transmitted to the tube shaft 9 from the crank shaft 1 via the crank gear 24, the clutch input gear 21, the clutch outer 4, the friction plates 10 and 11, the clutch hub 5, the dog coupling portion 37, the coupling hub 16 and the inclined spline coupling portion 40, is transmitted to the shift input shaft 2 from the tube shaft 9 via the clutch output shaft 8, and is transmitted to the rear wheel.

(On Engine Drive State at Low Torque)

In the case that the engine drive torque is low on the engine drive state, that is, in the case that the engine drive torque is changed in a range from 0 to T1 in FIG. 15, the pressing load increasing mechanism, the dog coupling portion 37 and the like are operated as follows.

Figure 6:
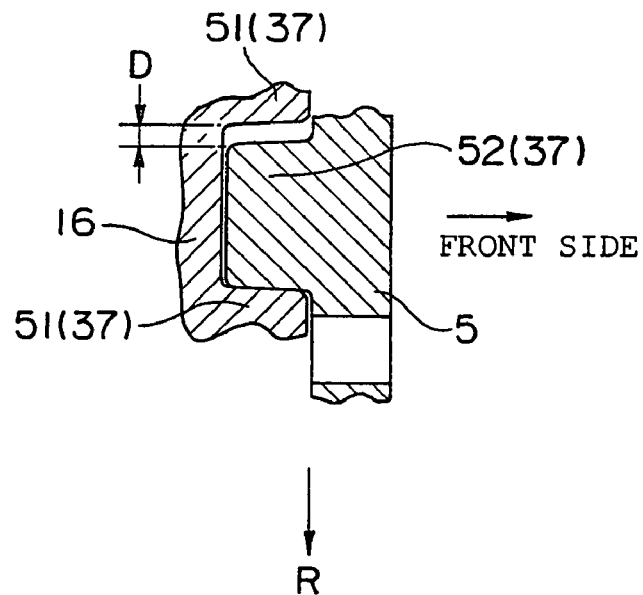
FIG. 6 is a cross sectional view along a line VI-VI in FIG. 5 on the engine drive state at a low torque.

FIG. 6 is a cross sectional view along a line VI-VI in FIG. 5, and shows a state of the dog coupling portion 37 on the engine drive state at the low torque. An end surface in the rotating direction R side of the projection portion 52 of the clutch hub 5 is brought into contact with an end surface in an opposite side to the rotating direction R side of the projection portion 51 of the coupling hub 16, thereby transmitting the engine drive torque from the clutch hub 5 to the coupling hub 16.

In FIG. 1, the coupling hub 16 is maintained at a front most end initial position by the return spring 43, and the clutch spring 15 is maintained in an initial set state. In other words, in FIG. 15, the initial pressing load W0 is maintained.

Accordingly, if the operation for disconnecting the clutch is executed by gripping the clutch lever in this low torque state, it is possible to execute the operation on the basis of the clutch operating load corresponding to the initial pressing load W0 (0.6 Wc), so that it is possible to disconnect the clutch on the basis of the light clutch operating force which is about 0.6 times the conventional one.

(Operation on Engine Drive State at Intermediate Torque)

In the case that the engine drive torque is at an intermediate height (magnitude) on the engine drive state mentioned above, that is, in the case that the engine drive torque is changed in a range between T1 and T4 in FIG. 15, the pressing load increasing mechanism, the dog coupling portion 37 and the like are operated as follows.

If the engine drive torque is increased more than T1 in FIG. 15, the engine drive torque applied to the tube shaft 9 from the coupling hub 16 via the inclined spline coupling portion 40 in FIG. 1 overcomes a friction force between the inclined splines 55,56 of the inclined spline coupling portion 40 and an elastic force of the return spring 43, thereby relatively rotating the coupling hub 16 to the rotating direction R side with respect to the tube shaft 9, and moving to the rear side from the initial position in FIG. 1 on the basis of a guide effect of the inclined spline coupling portion 40.

Figure 4:
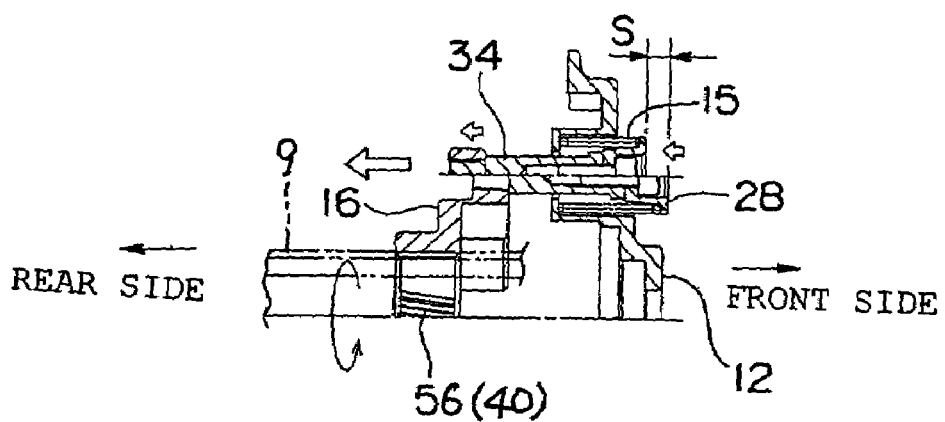
FIG. 4 is a vertical cross sectional view of the coupling hub, a clutch spring and a pressing member in FIG. 1, in which a lower portion shows a state of an initial pressing load, and an upper portion shows a state of an increased pressing load.

Since the coupling hub 16 is moved to the rear side, the spring receiving member 28 is also moved to the rear side via the coupling rod 34 as shown in an upper portion of FIG. 4, compresses the clutch spring 15 and increases the pressing load.

An increase of the pressing load W in this case is approximately in proportion to an increasing amount of the engine drive torque as shown by the range between T1 and T4 in FIG. 15.

(Operation on Engine Drive State at High Torque)

In the case that the engine drive torque becomes higher on the engine state drive mentioned above, that is, in the case that the engine drive torque is changed in a range from T4 to the maximum torque Tmax in FIG. 15, the pressing load increasing mechanism, the dog coupling portion 37 and the like are operated as follows.

In FIG. 1, the coupling hub 16 is moved to a maximum moving position at which the rear end surface 16c is brought into contact with the locking plate 42, and is locked at the maximum moving position, and the clutch spring 15 is maintained in a state of the maximum pressing load. In other words, the pressing load is maintained at a value of the maximum pressing load Wc which is approximately equal to the conventional pressing load, from T4 in FIG. 15 to the maximum engine drive torque Tmax.

In this case, on the engine drive state mentioned above, in the back torque limiter mechanism, the cam slant surface 53 does not act on the lifter pin 54 in any torque times as shown in FIG. 7 showing the low torque time and FIG. 9 showing the high torque time. In other words, the back torque limiter mechanism is not operated.

(2) Operation on Engine Brake State

FIG. 10 shows a state on a strong engine brake state. In this state, the coupling hub 16 is relatively rotated to the rotating direction R side with respect to the clutch hub 5 on the basis of an application of a great back torque from the rear wheel side, and an end surface in the rotating direction R side of the projection portion 51 of the coupling hub 16 is finally brought into contact with an end surface in an opposite side to the rotating direction R side of the projection portion 52 of the clutch hub 5.

Figure 11:
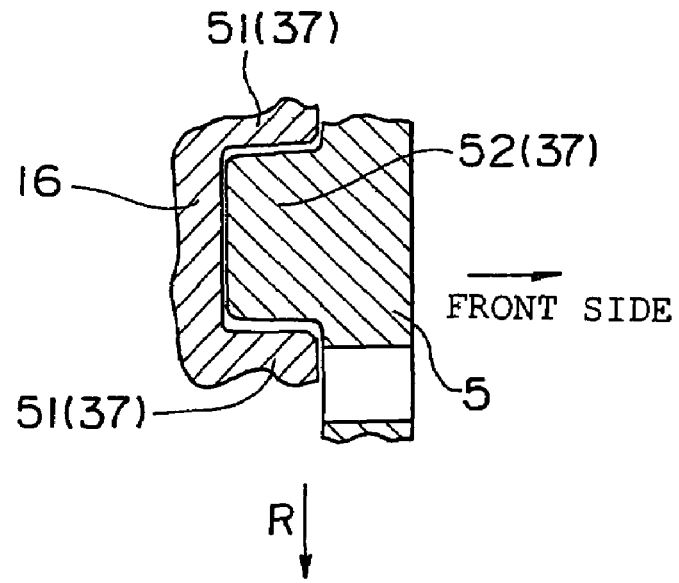
FIG. 11 is a cross sectional view along a line XI-XI in FIG. 10 on a weak engine brake state.

FIG. 11 shows a state of the dog coupling portion 37 on a weak engine brake, and shows a state in which the coupling hub 16 in the output side is in process of relatively rotating to the rotating direction R side with respect to the clutch hub 5.

FIG. 12 shows a state of the lifter pin 54 on the weak engine brake state as mentioned above. In this state, the coupling hub 16 is relatively rotated in the rotating direction R side with respect to the clutch hub 5, thereby pushing and moving the lifter pin 54 to the front side by the cam slant surface 53. Until the front end surface 54b of the lifter pin 54 is brought into contact with the rear end surface of the pressing member 12, that is, within the moving range of the gap C, only the lifter pin 54 is moved.

Figure 13:
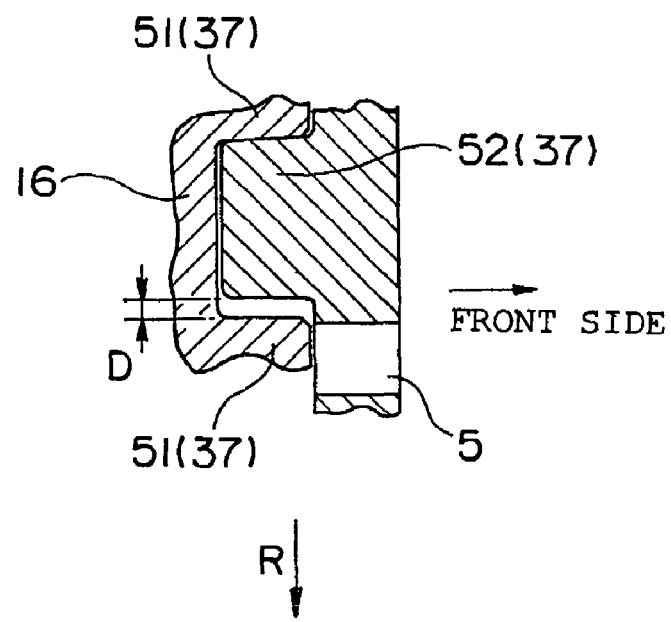
FIG. 13 is a cross sectional view along the line XI-XI in FIG. 10 on the strong engine brake state.

FIG. 13 shows a state of the dog coupling portion 37 on the strong engine brake state, which corresponds to a state in which the end surface in the rotating direction R side of the projection portion 51 of the coupling hub 16 is brought into contact with the end surface in the opposite side to the rotating direction R side of the projection portion 51 of the clutch hub 5. In this state, as shown in FIG. 14, the lifter pin 54 pushed and moved to the front side by the cam slant surface 53 moves the pressing member 12 at a distance L (about 0.5 mm to 0.8 mm) by the front end surface 54b, whereby the clutch comes to the half-clutch state or the disconnected state. In other words, there comes to a state in which the back torque limiter is operated on the basis of the application of the back torque at a predetermined value or more.

[Modified Example of Setting of Pressing Load by Clutch Spring]

Figure 16:
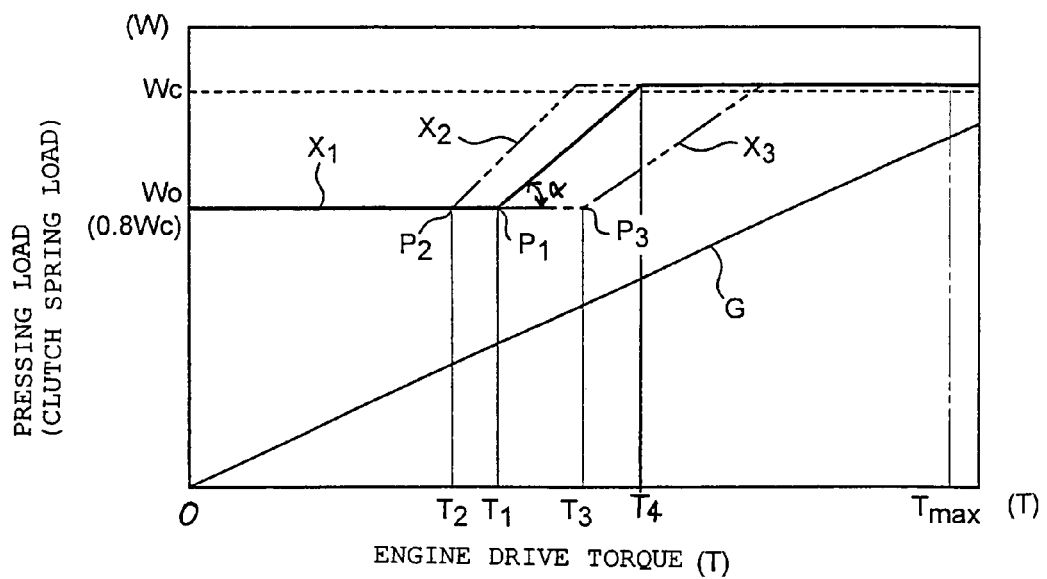
FIG. 16 is a view showing a change characteristic of the other pressing load in the embodiment in accordance with the present invention.

FIG. 16 is a view showing a change characteristic of the other pressing load similar to FIG. 15 and the FIG. 16 is applied to a machine type in which it is not necessary to widely reduce the clutch operating load and it is desired to improve a disconnection of the clutch. The same reference symbols as those in FIG. 15 are attached to respective graphs, respective points and the like corresponding to the graphs G, X1, X2 and X3, the points P1, P2 and P3 and the values T1, T2, T3 and the like in FIG. 15.

In the clutch having the change characteristic in FIG. 16, an initial pressing load W0 is set larger than the initial pressing load W0 (0.6 Wc) in FIG. 15. For example, the initial pressing load W0 of the clutch in FIG. 16 is set to about 0.8 times the maximum pressing load Wc. As alternated, it is possible to make the release stroke of the pressing surface 12a of the pressing member 12 in FIG. 1 larger in comparison with the case in FIG. 15, whereby it is possible to improve the disconnection of the clutch. In other words, it is possible to reduce the clutch operating load, and it is possible to improve the disconnection of the clutch.

Second Embodiment

Figure 17:
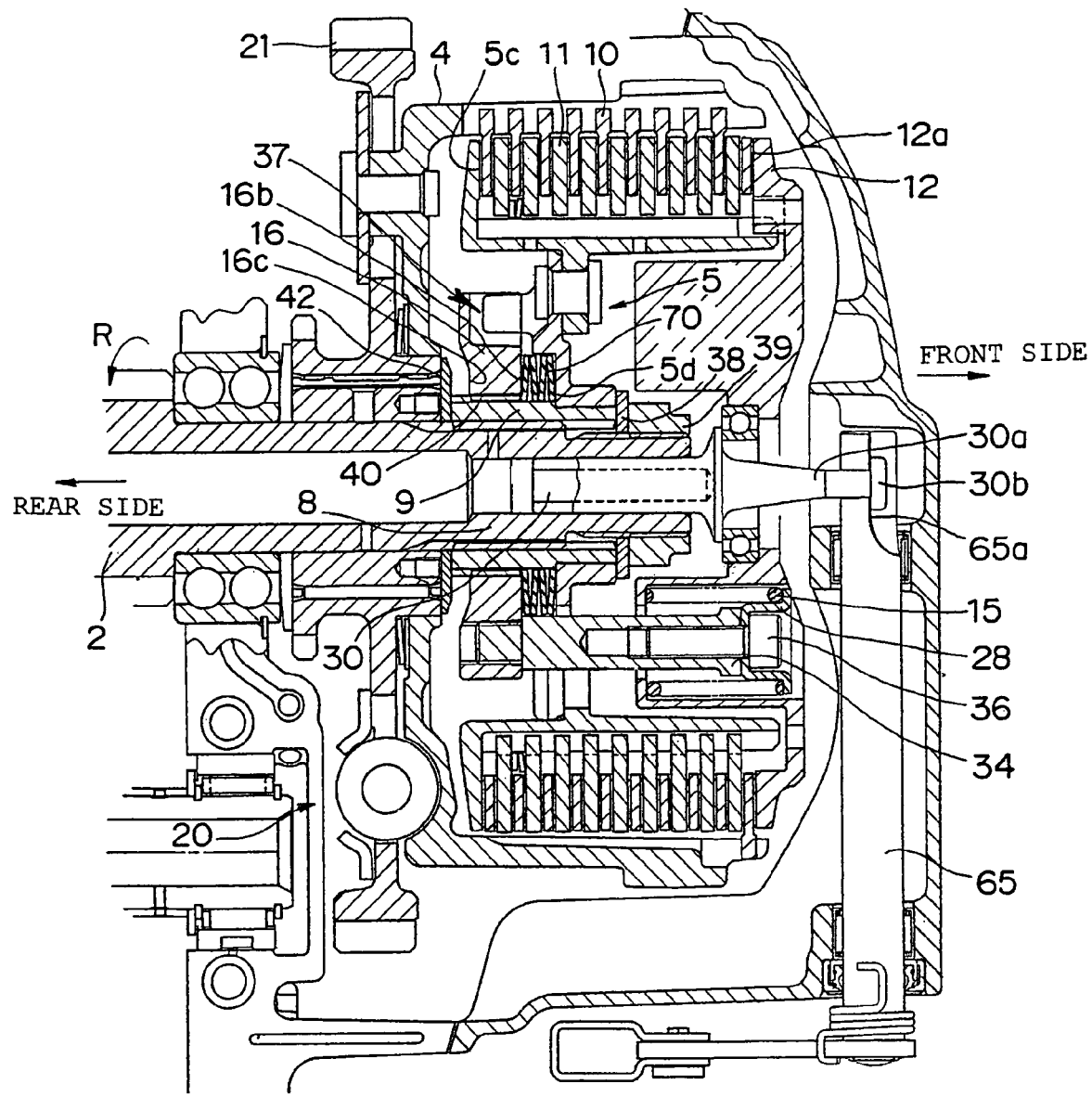
FIG. 17 is a vertical cross sectional view showing a second embodiment in accordance with the present invention.
Figure 18:
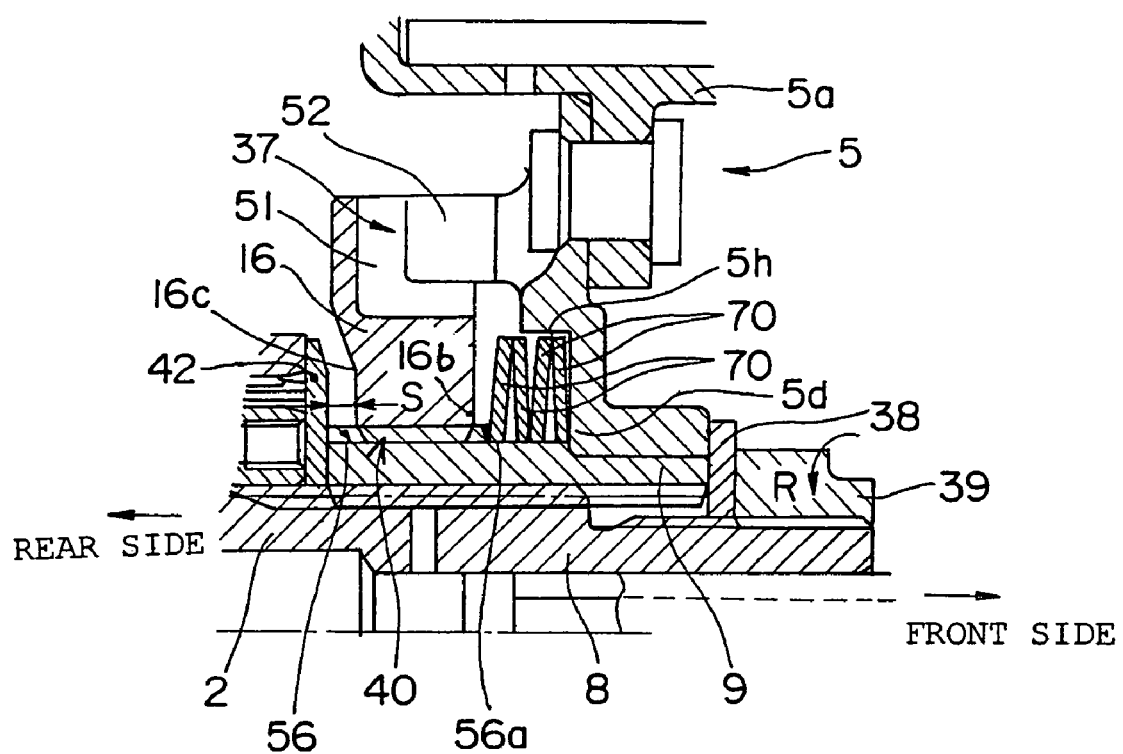
FIG. 18 is an enlarged view of a pressing load increasing mechanism in FIG. 17.
Figure 19:
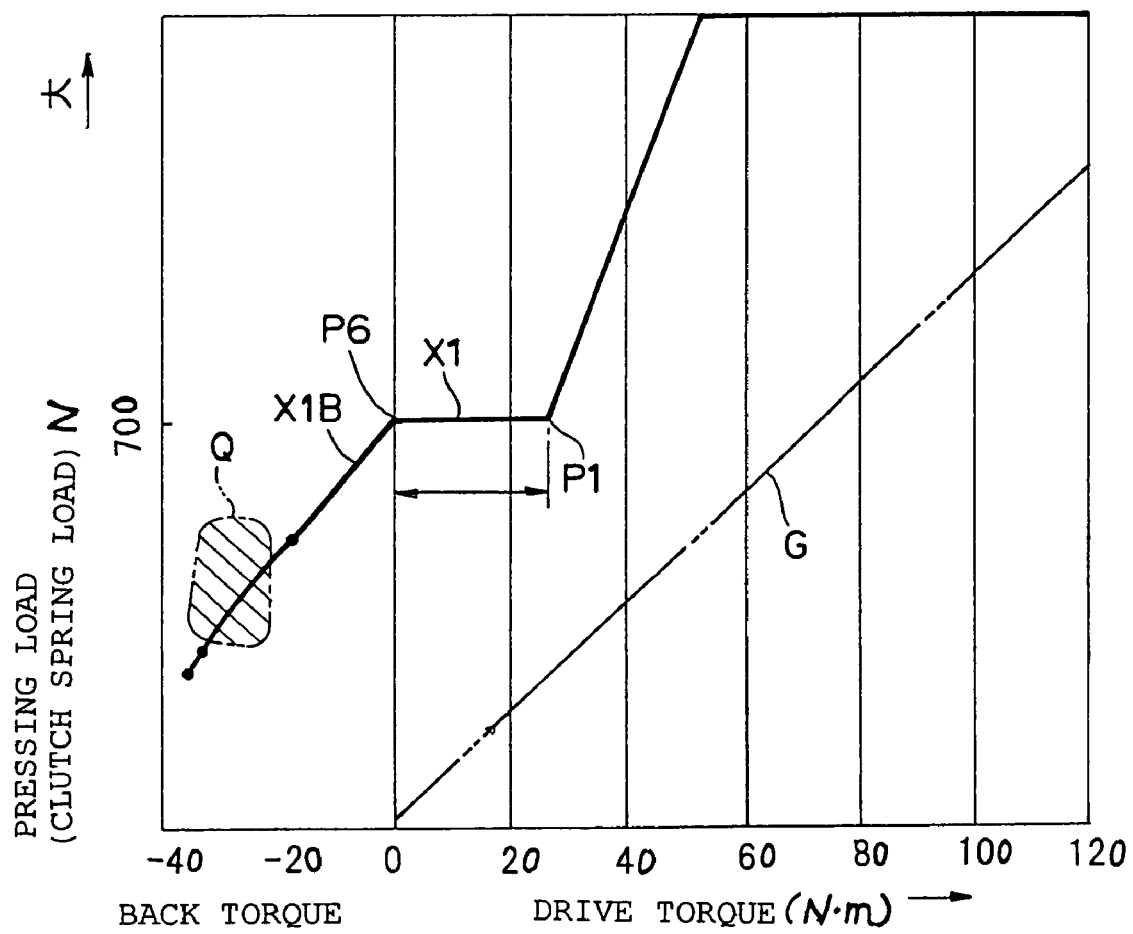
FIG. 19 is a view showing a change characteristic of the pressing load in the second embodiment.

FIGS. 17 to 19 show a second embodiment in accordance with the present invention, in which FIG. 17 is a vertical cross sectional view of a whole of a multiple disc friction clutch, FIG. 18 is an enlarged view of a pressing load increasing mechanism and a back torque limiter mechanism in FIG. 17 and shows a state in process of a torque increase on the engine drive state, and FIG. 19 is a view showing a change characteristic of the pressing load. In FIGS. 17 to 19, the same reference numerals are attached to the same parts and the like as those of the first embodiment.

The second embodiment as shown in FIG. 17 is different from the back torque limiter mechanism of the first embodiment as shown in FIG. 1 comprising lifter pin 53, cam slant 53 and etc. The back torque limiter mechanism of the second embodiment is structured such that the coupling hub 16 can move to the front side from an initial position in FIG. 17 on the basis of a screw feeding effect of the inclined spline coupling portion 40, in the case that the back torque is applied, and is provided with a back torque disc spring 70 compressed on the basis of the movement to the front side of the coupling hub 16 on the back torque, and not to have return spring 43 of the FIG. 1. Further, as a mechanism for driving the pressing member 12, a rotary cam shaft 65 having a planer cam surface 65a is arranged in a front side of the release rod 30, a cam follow portion 30a protruding to the front side is formed in a front end portion of the release rod 30, and a front end contact portion 30b of the cam follow portion 30a is brought into contact with the cam surface 65a of the rotary cam shaft 65. In other words, the structure is made such as to push the cam follow portion 30a to the front side by the cam surface 65a by rotating the rotary cam shaft 65, thereby moving the release rod 30 to the front side (the clutch off side) and disconnecting the clutch. Further, the dog type coupling portion 37 coupling the coupling hub 16 and the clutch hub 5 in the rotating direction is constituted by a projection portion 51 formed in an outer peripheral end portion in a diametrical direction of the coupling hub 16, and a projection portion 52 formed on a rear surface of the clutch hub 5, in FIG. 18.

A description will be given in detail of the back torque limiter mechanism. In FIG. 18, four back torque disc springs 70 are arranged in a M-shaped (or W-shaped) cross sectional form, and inner peripheral end portions of the respective disc springs 70 at a front end position and a rear end position are pressure contacted with a rear end surface 5d of an inner peripheral boss portion of the clutch hub 5, and a shoulder 56a formed on an outer peripheral surface of the tube shaft 9, respectively. In other words, four back torque disc springs 70 are provided so as to be compressed in an axial direction by a predetermined set load between the rear end surface 5d of the inner peripheral boss portion of the clutch hub 5 and the shoulder 56a of the tube shaft 9. A cylindrical guide surface 5h surrounding the back torque disc spring 70 from an outer side in a radial direction is formed in the clutch hub 5. In this case, as the shoulder 56a, there is utilized a front end portion of the inclined spline portion 56 of the tube shaft 9 constructing the inclined spline coupling portion 40.

(Initial Setting)

The back torque disc spring 70 is provided so as to be compressed by the predetermined set load between the shoulder 56a of the tube shaft 9 and the rear end surface 5d of the clutch hub 5 as mentioned above, the coupling hub 16 is kept at an initial position in a state in which the front end surface 16b of the inner peripheral portion is pressure contacted with the disc spring 70 positioned at rear end as shown in FIG. 17, and the pressing load of the clutch is set such as to come to, for example, about initial 700 N under the state.

[Operation]

(1) Operation on Engine Drive State

On an engine drive state at a low torque, on an engine drive state at an intermediate torque and on an engine drive state at a high torque, an operation of the pressing load increasing mechanism is substantially the same as the case of the first embodiment, and the same operations and effects are generated. In this case, since the return spring 43 as shown in FIG. 1 is not provided, in the case that the torque is increased on the engine drive state, the coupling hub 16 is moved to the rear side against only the elastic force of the clutch spring 15, thereby increasing the pressing load of the clutch spring 15.

(2) Operation on Engine Brake State

In FIG. 17, if the back torque is applied from the rear wheel side, the coupling hub 16 is relatively rotated in the rotating direction R side with respect to the clutch hub 5, and the coupling hub 16 is moved to the front side from the initial position in FIG. 17 while compressing the back torque disc spring 70, on the basis of the screw feeding effect of the inclined spline coupling portion 40. Since the coupling hub 40 is moved to the front side as mentioned above, the spring receiving member 28 is moved to the front side via the coupling rod 34, thereby reducing the pressing load of the clutch spring 15.

In a graph X1 in FIG. 19, a portion indicated by reference X1B shows a change of the pressing load when the back torque is applied. The pressing load is reduced approximately in proportion to an increase (a movement to a left side) of the back torque, and if the back torque is increased to a predetermined range Q (for example, −20 to −30 N·m), a half-clutch state is established. In other words, there is established a state in which the back torque limiter is operated.

In accordance with the second embodiment, since the pressing member 12 is not moved to the clutch off side (the front side) as is different from the first embodiment in FIG. 2 in the case that the back torque is applied, there is not generated a pulsation phenomenon of the clutch lever caused by a small oscillation transmitted to the clutch lever from the pressing member 12, for example, in the case of moving the pressing member 12 to the clutch off side.

In this case, it is possible to optionally set a time (P6 in FIG. 19) at which the pressing load starts being reduced on the back torque or an inclination of a reducing amount (X1B in FIG. 19) of the pressing load with respect to the back torque, by changing a spring strength or a set load of the back torque disc spring 70.

Third Embodiment

Figure 20:
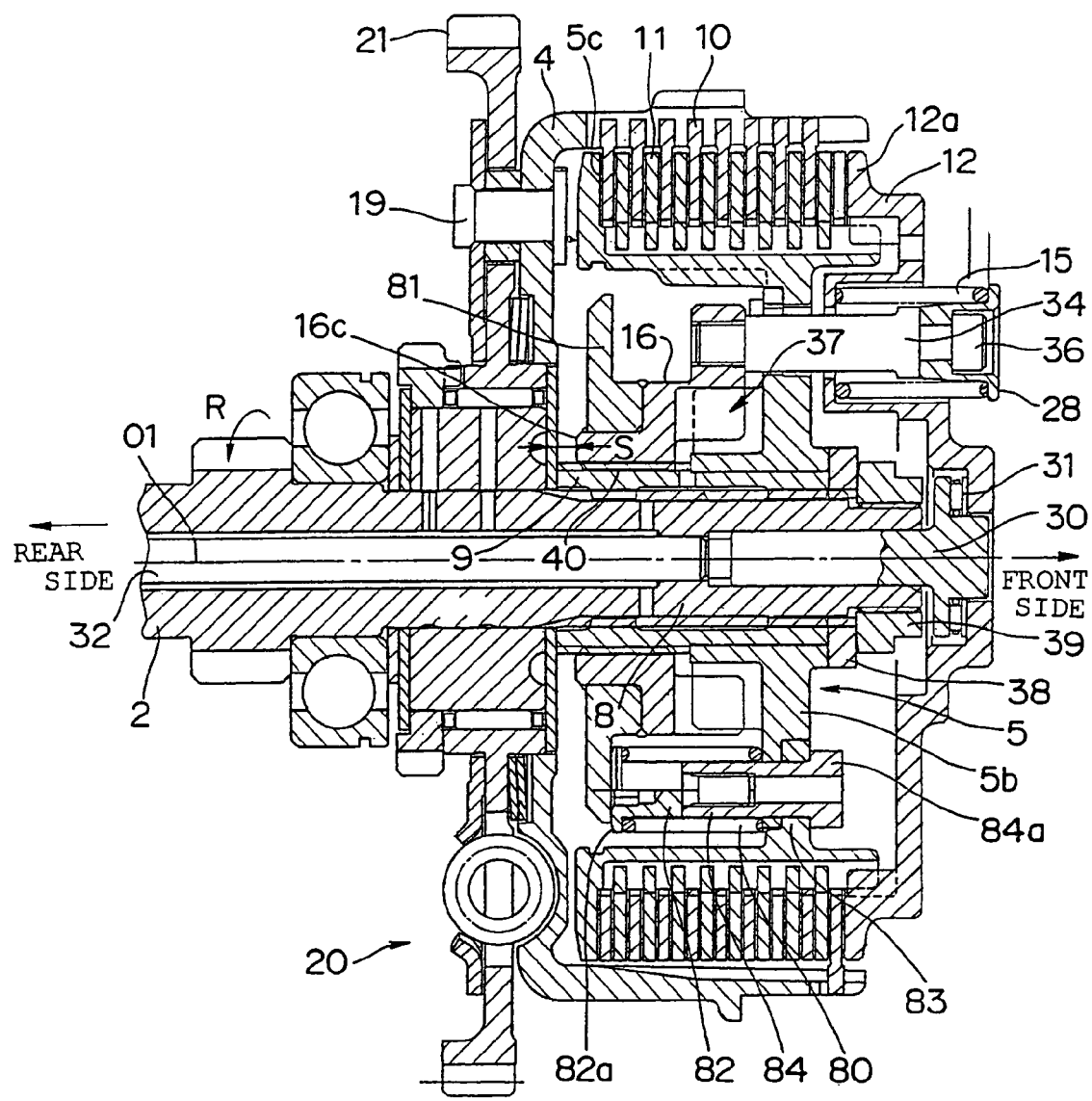
FIG. 20 is a vertical cross sectional view showing a third embodiment in accordance with the present invention.

FIG. 20 shows a third embodiment in accordance with the present invention, and the same reference numerals are attached to the same parts and the like as those of the first embodiment.

The third embodiment as shown in FIG. 20 is different from the back torque limiter mechanism of the first embodiment as shown in FIG. 1 comprising lifter pin 53, cam slant 53 and etc. The back torque limiter mechanism of the third embodiment is structured such that the coupling hub 16 can move to the front side from an initial position in FIG. 20 on the basis of a screw feeding effect of the inclined spline coupling portion 40, in the case that the back torque is applied, and is provided with a back torque coil spring 80 compressed on the basis of the movement to the front side of the coupling hub 16 on the back torque, and not to have the return spring 43 of the FIG. 1.

A description will be given in detail of the back torque limiter mechanism. A plurality of (for example, three) rod insertion holes 83 are formed in the clutch hub 5 so as to be spaced in a circumferential direction, a stopper rod 84 is inserted to each of the rod insertion holes 83 from a front side, a spring receiving bolt 82 is screwed to a rear end female thread portion of the stopper rod 84, and the back torque coil spring 80 is provided between a rear end flange portion 82a of the spring receiving bolt 82 and a rear end surface of the clutch hub 5 so as to be compressed in an axial direction by a predetermined load.

On the other hand, a flange member 81 protruding to an outer side in a radial direction is fixed to the coupling hub 16 such that a front end surface of the flange member 81 is pressure contacted with the rear end flange portion 82a of the spring receiving bolt 82.

(Initial Setting)

As mentioned above, the back torque coil spring 80 is arranged between the rear end flange portion 82a of the spring receiving bolt 82 and the rear end surface of the clutch hub 5, and a front end flange portion 84a of the stopper rod 84 is pressure contacted with the front end surface of the clutch hub 5, thereby compressing the back torque coil spring 80 by the predetermined set load. The coupling hub 16 is kept at the initial position in a state in which the front end surface of the flange member 81 is pressure contacted with the rear end surface of the spring receiving bolt 82, and the pressing load of the clutch is set in such a manner as to come to, for example, about the initial 700 N in this state.

[Operation]

(1) Operation on Engine Drive State

On an engine drive state at a low torque, on an engine drive state at an intermediate torque and on an engine drive state at a high torque, an operation of the pressing load increasing mechanism is substantially the same as the case of the first embodiment, and the same operations and effects are generated. In this case, since the return spring 43 as shown in FIG. 1 is not provided, in the case that the torque is increased on the engine drive state, the coupling hub 16 is moved to the rear side against only the elastic force of the clutch spring 15, thereby increasing the pressing load of the clutch spring 15.

(2) Operation on Engine Brake State

In FIG. 20, if the back torque is applied from the rear wheel side, the coupling hub 16 is relatively rotated in the rotating direction R side with respect to the clutch hub 5, and the coupling hub 16 is moved to the front side from the initial position in FIG. 20 integrally with the flange member 81, on the basis of the screw feeding effect of the inclined spline coupling portion 40, basically in the same manner as the second embodiment mentioned above. The back torque coil spring 80 is compressed between the rear end flange portion 82a of the spring receiving bolt 82 and the rear end surface of the clutch hub 5 on the basis of the movement of the coupling hub 16 to the front side, and the spring receiving member 28 is moved to the front side via the coupling rod 34, thereby reducing the pressing load of the clutch spring 15.

A change of the pressing load on the back torque is the same as the change shown in FIG. 19 described in the second embodiment mentioned above. In other words, in the graph X1, the portion indicated by reference X1B shows the change of the pressing load when the back torque is applied. The pressing load is reduced approximately in proportion to the increase (the movement to the left side) of the back torque, and if the back torque is increased to the predetermined range Q (for example, −20 to −30 N·m), the half-clutch state is established. In other words, there is established the state in which the back torque limiter is operated.

In accordance with the third embodiment, since the pressing member 12 is not moved to the clutch off side (the front side) as is different from the first embodiment on the back torque, in the same manner as the second embodiment mentioned above, there is not generated a pulsation phenomenon of the clutch lever caused by a small oscillation transmitted to the clutch lever from the pressing member 12, in the case of moving the pressing member 12 to the clutch off side.

Further, it is possible to optionally set a time (P6 in FIG. 19) at which the pressing load starts being reduced or an inclination of a reducing amount (X1B in FIG. 19) of the pressing load with respect to the back torque, by changing a spring strength or a set load of the back torque coil spring 80.

Further, since the coil spring 80 is used for the back torque, it is possible to precisely and simply change the set load in comparison with the disc spring.

Fourth Embodiment

Figure 21:
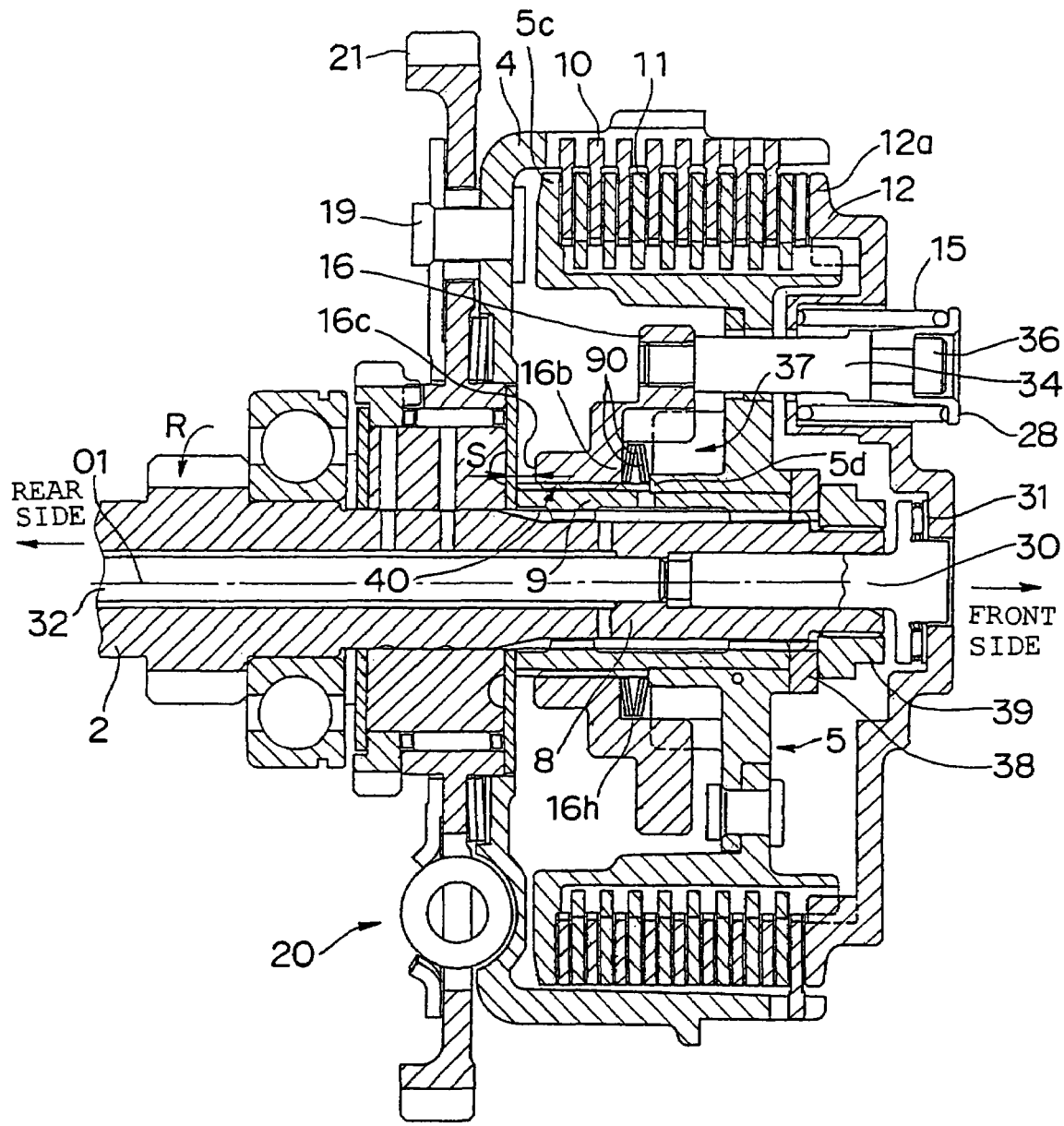
FIG. 21 is a vertical cross sectional view showing a fourth embodiment in accordance with the present invention.

FIG. 21 shows a fourth embodiment in accordance with the present invention, and the same reference numerals are attached to the same parts and the like as those of the first embodiment.

A different structure from the first embodiment exists in a structure in which the back torque limiter mechanism in FIG. 21 is structured such that the coupling hub 16 can move to the front side from an initial position in FIG. 21 on the basis of a screw feeding effect of the inclined spline coupling portion 40, in the case that the back torque is applied, and is provided with a back torque disc spring 90 compressed on the basis of the movement to the front side of the coupling hub 16 on the back torque.

The back torque limiter mechanism having the back torque disc spring 90 is approximately the same as the second embodiment mentioned above, however, a different structure from the second embodiment exists in a structure in which two pairs of back torque disc springs 90 are arranged in a two-ply manner in a tapered cross sectional shape (or a V-shaped cross sectional form), and the shoulder for locking an inner peripheral end portion of the back torque disc spring 90 positioned at rear end is not formed on the outer peripheral surface of the tube shaft 9. Accordingly, in a state in which the coupling hub 16 is positioned at the initial position as in FIG. 21, the back torque disc spring 90 is in a state of being compressed between the front end surface 16b of the inner peripheral portion of the coupling hub 16 and the rear end surface 5d of the inner peripheral boss portion of the clutch hub 5.

(Initial Setting)

The back torque disc spring 90 is provided so as to be compressed between the front end surface 16b of the inner peripheral portion of the coupling hub 16 and the rear end surface 5d of the inner peripheral boss portion of the clutch hub 5 as mentioned above, the pressing load of the clutch is set such as to come to, for example, about the initial 700 N, in a state in which the coupling hub 16 is positioned at an initial position having the torque "0", by selecting the spring strength and the shape of the back torque disc spring 90.

[Operation]

(1) Operation on Engine Driving State

On an engine drive state at a low torque, on an engine drive state at an intermediate torque and on an engine drive state at a high torque, an operation of the pressing load increasing mechanism is substantially the same as the case of the first embodiment, and the same operations and effects are generated. In this case, since the return spring 43 as shown in FIG. 1 is not provided, and the disc spring locking shoulder (56a) as shown in FIG. 17 is not formed, the elastic force of the back torque disc spring 90 is slightly applied to the coupling hub 16 until the front end surface 16b of the inner peripheral portion of the coupling hub 16 is detached from the back torque disc spring 90 positioned at rear end, on the engine drive state at the low torque.

(2) Operation on Engine Brake State

Since the operation is approximately the same as the second embodiment, a description thereof will be omitted.

In accordance with the fourth embodiment, since the pressing member 12 is not moved to the clutch off side (the front side) as is different from the first embodiment on the back torque, there is not generated a pulsation phenomenon of the clutch lever caused by a small oscillation transmitted to the clutch lever from the pressing member 12, for example, in the case of changing the pressing member 12 to the clutch off direction.

Other Embodiments (1) Each of the embodiments mentioned above utilizes the pressing load increasing mechanism for reducing the clutch operating load by setting the initial pressing load small, however, the clutch in accordance with the present invention can be structured such that the initial set load is set to the same level as the conventionally fixed pressing load, and the maximum pressing load generated by the pressing load increasing mechanism becomes larger than the conventionally fixed pressing load. In accordance with this structure, for example, it is possible to reduce the number of the friction plate or make the diameter of the friction plate small while maintaining the conventional torque transmission capacity and it is possible to achieve a reduction of the parts number of the clutch and a reduction in size.

(2) In the first to fourth embodiments, the inclined splines 55 and 56 of the inclined spline coupling portion 40 are formed in straight or linear, and are inclined with respect to the output shaft core O1, however, it is possible to employ a spiral-shaped or helical teeth portion, and the tooth surface is not limited to the involute tooth surface. Further, the angle θ of incline of the guide groove or the guide projection of the inclined spline portions 55 and 56 is not limited to 8 degree, 10 degree or 12 degree mentioned above. The angle θ of incline may be appropriately selected in accordance with the machine type or the like of the motor cycle. However, if the angle θ of incline is too large, the engine drive torque corresponding to the point (the point P1 or the like in FIG. 15) starting the increase of the pressing load becomes too small. On the contrary, if the angle θ of incline is too small, there is a possibility that the coupling hub 16 can not move in the axial direction on the tube shaft 9. Therefore, it is necessary to set the angle θ of incline within at least a range between 2 degree and 45 degree, and the angle θ of incline is preferably set within a range between about 5 degree and 30 degree.

(3) In the first to fourth embodiments, the inclined spline coupling portion 40 is provided as the pressing load increasing mechanism arranged between the coupling hub 16 and the tube shaft 9 corresponding to the output side rotating member. However, in place of the inclined spline coupling portion, the present invention may be structured such that three of more inclined guide grooves are formed in one of the outer peripheral surface of the tube shaft 9 and the inner peripheral surface of the coupling hub 16, and projections engaging with the guide grooves are formed in the other, or may be structured such that three of more inclined guide projections are formed in one of the outer peripheral surface of the tube shaft 9 and the inner peripheral surface of the coupling hub 16, and grooves engaging with the inclined guide projections mentioned above are formed in the other.

(4) In the first to fourth embodiments, the tube shaft 9 spline fitted to the outer periphery of the clutch output shaft 8 is utilized as the clutch output side rotating member to which the engine rotating torque is transmitted from the coupling hub 16 via the inclined spline coupling portion 40 or the like, however, the clutch output shaft 8 can be utilized as the clutch output side rotating member. In other words, the structure may be made such that the inclined spline or the like is formed on the outer peripheral surface of the clutch output shaft 8, and is engaged with the inclined spline of the coupling hub 16.

(5) The present invention is not limited to the structure in each of the embodiments mentioned above, but various modified embodiments can be applied within the range described in claims.

What is claimed is:

1. A multiple disc friction clutch comprising:
    a clutch outer member for transferring power from an engine to the multiple disc friction clutch;
    a clutch hub for transferring power from the multiple disc friction clutch to a rotating member, the clutch hub having a cylindrical outer member;
    a plurality of input friction plates and output friction plates arranged between the clutch outer member and the clutch hub;
    a clutch spring for pressing a pressing member onto the friction plates in an axial direction of the rotating member so as to connect the multiple disc friction clutch;
    a spring receiving member for supporting the clutch spring; and
    a coupling hub arranged in an outer periphery of the rotating member and coupled to the spring receiving member such that the coupling hub and the spring receiving member are integrally movable in the axial direction of the rotating member, the coupling hub being arranged inside of the cylindrical outer member of the clutch hub,
    wherein inclined splines are formed on an inner peripheral surface of the coupling hub and an outer peripheral surface of the rotating member such that the coupling hub is operable to engage the rotating member, the inclined splines being inclined relative to the rotational axis of the rotating member, and
    wherein the multiple disc friction clutch is configured such that the coupling hub moves so as to compress the clutch spring in the axial direction of the rotating member and rotates relative to the rotating member when an engine drive torque is increased to a predetermined value or to more than the predetermined value.

2. The multiple disc friction clutch as claimed in claim 1, wherein the multiple disc friction clutch is provided with a return spring urging the coupling hub against the pressing of the clutch spring.

3. A multiple disc friction clutch as claimed in claim 1, further comprising a back torque limiter mechanism,
    wherein a lifter member movable in the axial direction of the rotating member is arranged as the back torque limiter mechanism so as to face to the pressing member from the axial direction of the rotating member, and
    wherein the multiple disc friction clutch is configured such that when a back torque from the rotating member becomes equal to or more than a predetermined value the coupling hub rotates relative to the clutch hub in a rotating direction, the lifter member is moved in the axial direction of the rotating member by a cam mechanism, and the pressing member is pushed and moved in a clutch off direction.

4. The multiple disc friction clutch as claimed in claim 1, further comprising a back torque limiter mechanism,
    wherein the back torque limiter mechanism is structured such that the coupling hub moves the spring receiving member so as to reduce a pressing load generated by the clutch spring when a back torque becomes equal to or more than a predetermined value, and
    wherein the back torque limiter is provided with a back torque spring which is compressed by movement of the coupling hub based on the back torque.

5. The multiple disc friction clutch as claimed in claim 4, wherein the back torque spring is constituted by one or a plurality of disc springs.

6. The multiple disc friction clutch as claimed in claim 4, wherein the back torque spring is constituted by one or a plurality of coil springs.

7. The multiple disc friction clutch as claimed in claim 4, wherein the back torque spring is provided so as to be compressed at a predetermined set load by a locking means constituted by an member independent from the coupling hub.

8. A motor cycle provided with a multiple disc friction clutch, wherein the multiple disc friction clutch comprises:
    a clutch outer member for transferring power from an engine to the multiple disc friction clutch;
    a clutch hub for transferring power from the multiple disc friction clutch to a rotating member, the clutch hub having a cylindrical outer member;
    a plurality of input plates and output plates arranged between the clutch outer member and the clutch hub;
    a clutch spring for pressing a pressing member onto the friction plates in an axial direction of the rotating member so as to connect the multiple disc friction clutch;
    a spring receiving member for supporting the clutch spring; and
    a coupling hub arranged in an outer periphery of the rotating member and coupled to the spring receiving member such that the coupling hub and the spring receiving member are integrally movable in the axial direction of the rotating member, the coupling hub being arranged inside of the cylindrical outer member of the clutch hub, wherein inclined splines are formed on an inner peripheral surface of the coupling hub and an outer peripheral surface of the rotating member such that the coupling hub is operable to engage the rotating member, the inclined splines being inclined relative to the rotational axis of the rotating member, and wherein the multiple disc friction clutch is configured such that the coupling hub moves so as to compress the clutch spring in the axial direction of the rotating member and rotates relative to the rotating member when an engine drive torque is increased to a predetermined value or to more than the predetermined value.

9. A multiple disc friction clutch comprising:

a clutch outer member for transferring power from an engine to the multiple disc friction clutch;

a clutch hub for transferring power from the multiple disc friction clutch to a clutch output shaft, the clutch hub having a cylindrical outer member;

a plurality of input friction plates and output friction plates arranged between the clutch outer member and the clutch hub;

a compression coil spring for pressing a pressing member toward the clutch hub in a direction parallel to the clutch output shaft;

a spring receiving member for supporting the compression coil spring from an opposite side of the pressing member in an axial direction of the compression coil spring; and a coupling hub arranged in an outer periphery of the clutch output shaft and coupled to the spring receiving member such that the coupling hub and the spring receiving member are integrally movable in the axial direction of the clutch output shaft, the coupling hub being arranged inside of the cylindrical outer member of the clutch hub, wherein the coupling hub is attached to the clutch hub so as to rotate with the clutch hub around the rotational axis of the clutch output shaft, and wherein a guide portion is provided between an inner peripheral surface of the coupling hub and an outer peripheral surface of the clutch output shaft, the guide portion guiding the coupling hub such that the spring receiving member moves toward the pressing member in an axial direction of the clutch output shaft and the coupling hub rotates relative to the clutch output shaft when torque is transmitted from the engine.

10. The multiple disc friction clutch of claim 9, further comprising:

a return spring for urging the coupling hub to move relative to the clutch output shaft so as to move the spring receiving member away from the pressing member in an axial direction of the clutch output shaft.

11. The multiple disc friction clutch of claim 9, further comprising:

a back torque spring for urging the coupling hub to move relative to the clutch output shaft so as to move the spring receiving member away from the pressing member;

wherein the guide portion guides the coupling hub such that the spring receiving member moves away from the pressing member in an axial direction of the clutch output shaft and the coupling hub rotates relative to the clutch output shaft in an opposite direction of the clutch rotating direction.

* * * * *